UNITED STATES PATENT OFFICE 2,352,065

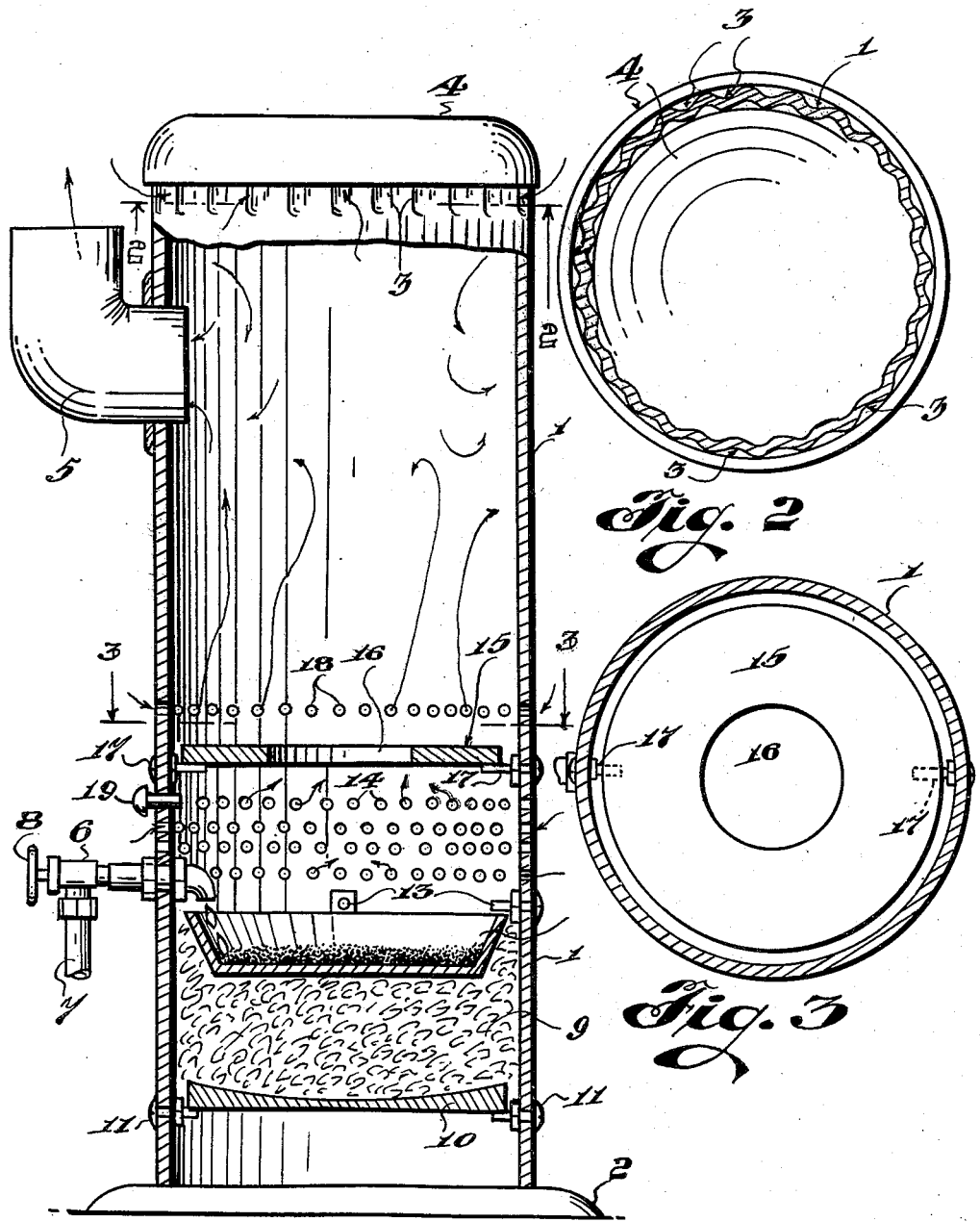

LIQUID FUEL HEATER

Walter F. Adams, Seagoville, Tex.

Application February 26, 1943, Serial No. 477,257

3 Claims. (Cl. 126—93)

This invention relates to improvements in heating stoves or apparatus wherein liquid hydrocarbons are used as fuel, and more particularly the invention concerns an oil burning, space heater.

The primary object of the invention is the provision of an economical and efficient heater for buildings and rooms where infiltration of air is a problem, and heating needs to be largely by direct radiation. This is particularly so in the maintenance of the desired floor temperature, and where, because of such infiltration of air into the space to be heated, it is desirable for the heating unit to have great reserve capacity to combat the difficulties arising from high winds.

Another object of the invention is the provision of a two-stage pot-type oil burning space heater of simple design, construction and operation, combined with accessibility to all parts for replacement, without the removal of bolts or screws, frequently "burned tight."

A construction designed to carry out the above objects and advantages is illustrated in the accompanying drawing, and described and claimed in the following specification, and in the drawing:

Figure 1 is a vertical sectional view of a heater embodying the invention;

Figure 2 is a cross-sectional view, had on the line 2—2 of Figure 1; and

Figure 3 is a similar view on line 3—3 of Figure 1, but taken lower down.

In carrying out the invention there is provided a cylinder 1, with a base 2, the top or upper marginal edges of the cylinder as at 3 having corrugations or being crimped for a purpose hereinafter to be explained in detail. A top or cover is shown at 4, an elbow 5 inserted in an opening in the cylinder for connection to a flue is disposed below the cover 4, and 6 indicates a valve assembly for feeding fuel to the heater. A pipe 7, connected to a gravity feed tank (not shown) conducts the fuel to the valve assembly, the latter being controlled by the handle 8.

The heater is designed to operate with almost unlimited turn-down ratio resulting from the use of insulating material in retaining heat, and also at low flame, that portion of the radiating surface nearest the floor operates at a high temperature for effective direct radiation, also due to insulating material. This insulating material may be rock wool or other heat insulating substance, indicated at 9. This insulating material is supported upon a tray or similar member 10 which is loosely held in position by the small bolts 11. Upon this material is seated a fuel pan, the pan 12 being held in such position by the small bolts 13. The pan is spaced from the walls of the cylinder 1 and is not connected to the bolts 13, these bolts being utilized to slightly compress the pan upon the insulating material 9. In this manner of holding the pan, the latter may be said to be in a "floating" or loose position and can be very easily removed when desired. If preferred a small amount of ashes may be placed in the pan to make the ignition easier, the fuel being absorbed by the ashes and providing quicker lighting. Above the fuel pan are placed a plurality of spaced perforations 14.

For the purpose of restricting and thereby more efficiently mixing and providing better combustion, a baffle plate 15 having a central opening 16 is disposed above the perforations 14. This plate does not contact the inner cylinder walls and rests loosely upon small bolts 17, similar to bolts 13.

The construction also provides for further apertures 18, located above the plate 15, and a removable lighting plug 19 for insertion of a match or the like to ignite the fuel.

In the operation of the heater, kerosene or light fuel oil enters by gravity through the pipe 7 and valve assembly 6 and drops into the fuel pan 12, where it vaporizes and mixes with the air entering through the perforations 14 in the cylinder 1. The gases are insured efficient mixing and combustion by the plate 15. Air entering the perforations 18 above the ring or plate 15 aid in consuming such gases as may flow around the edges of the ring or plate which as pointed out fits loosely within the cylinder. Such perforations also serve as an additional air inlet between the first stage of heating as previously described and the final or upper stage. For the upper stage of heating in the heater, air entering between the crimped or corrugated edges 3 of the cylinder and the cover 4, impinge upon and mixes with the unconsumed gases from the lower stage, causing them to burst into a hot, yellow, smokeless flame, confined in a small space and heating the surrounding cylinder to a high temperature. Spent gases are carried off by the elbow or vent 5 to a flue. The entire regulation of the heater is accomplished by varying the opening of the valve 6.

The fuel pan 12, resting upon the insulating material 9, attains a much higher temperature in operation at all stages than it would otherwise. When the flame is lowered so that it does not burn evenly all around the burner, carbon is formed in the fuel pan near the fuel inlet. In the course of several hours, a troublesome amount of carbon may accumulate, but as soon as the flame is raised somewhat, the temperature of the insulated fuel pan and the carbon deposit within it is heightened, and the carbon is gradually consumed, so that over a period of months of average use, accumulation of carbon is not excessive.

The fact that the fuel pan is insulated and that the plate or ring rests upon three or more bolts, projecting into the cylinder as shown (allowing but little transfer of heat from the plate to the cylinder) causes both the pan and the plate to operate at a high temperature and this aids in the vaporization of the fuel at all stages of operation. It is pointed out that any fuel tank used to deliver fuel to the valve must be approximately eighteen inches above the level of the floor on which the heater rests.

From the foregoing it will be apparent that the heater is very simple, is easily operated and economical. It should be understood, however, that some variations in construction are possible in line with the inventive thought and such as would be within the scope and meaning of the claims appended hereto.

What is claimed is:

1. A liquid fuel heater comprising a hollow drum for containing combustible gases, the upper end of the drum being corrugated, a cover fitting over the corrugations and providing air inlets to the drum, a vent for exit of burned gases, a member loosely supported in the lower end of the drum and forming a support for insulating material, a fuel pan resting in floating fashion on the insulating material and away from the inner walls of the drum, a valve means for admitting fuel to the fuel pan, a plurality of perforations above the fuel pan for inlet of air for combustion purposes with the gases generated within the drum, a baffle plate with a central opening to restrict the flow of gases from the first to the second stage of combustion, a plurality of apertures above the baffle plate, for air inlet in the second stage of vaporization and gas combustion, the inlets for air in the corrugated rim of the drum co-operating with the second stage of operation in the production of vaporization and combustion, and a removable plug for igniting purposes disposed in the wall of the drum.

2. A liquid fuel heater as claimed in claim 1, said insulating material support being spaced from the lower end of the cylinder, spaced from the walls thereof and loosely held upon members in the cylinder walls, said baffle plate being similarly supported and in spaced relation above the pan.

3. A liquid fuel heater as claimed in claim 1, said valve means including a nozzle projecting inside the cylinder walls slightly above the fuel pan for admitting fuel to the pan; said fuel pan being floatingly held on the insulating material by projecting members in the cylinder walls for easy removal of the pan.

WALTER F. ADAMS.